United States Patent
Song et al.

(10) Patent No.: US 7,179,673 B2
(45) Date of Patent: Feb. 20, 2007

(54) METHOD OF FABRICATING LIQUID CRYSTAL DISPLAY DEVICE

(75) Inventors: In-Duk Song, Kyongsangbuk-do (KR); Ho-Jin Ryu, Kyonggi-do (KR)

(73) Assignee: LG.Philips LCD Co., Ltd., Seoul (KR)

(*) Notice: Subject to any disclaimer, the term of this patent is extended or adjusted under 35 U.S.C. 154(b) by 206 days.

(21) Appl. No.: 10/690,573

(22) Filed: Oct. 23, 2003

(65) Prior Publication Data

US 2004/0126916 A1 Jul. 1, 2004

(30) Foreign Application Priority Data

Dec. 30, 2002 (KR) .................. 10-2002-0087480

(51) Int. Cl.
*H01L 21/00* (2006.01)
*H01L 29/10* (2006.01)
*G02F 1/1339* (2006.01)

(52) U.S. Cl. .................. 438/30; 438/38; 257/59; 257/72; 349/190; 349/189; 349/153

(58) Field of Classification Search .................. 438/30, 438/38; 257/59, 72; 349/190, 189, 153
See application file for complete search history.

(56) References Cited

U.S. PATENT DOCUMENTS

| | | | | |
|---|---|---|---|---|
| 5,287,208 A | * | 2/1994 | Shimoto et al. | 349/123 |
| 5,780,871 A | * | 7/1998 | den Boer et al. | 257/59 |
| 5,838,314 A | * | 11/1998 | Neel et al. | 725/8 |
| 5,919,606 A | * | 7/1999 | Kazlas et al. | 430/321 |
| 5,963,689 A | * | 10/1999 | Hesselbom | 385/53 |
| 6,037,044 A | * | 3/2000 | Giri et al. | 428/209 |
| 6,057,896 A | * | 5/2000 | Rho et al. | 349/42 |
| 6,330,043 B1 | * | 12/2001 | Kikkawa et al. | 349/43 |
| 6,414,729 B1 | * | 7/2002 | Akiyama et al. | 349/38 |
| 6,597,415 B2 | * | 7/2003 | Rho et al. | 349/42 |
| 6,707,511 B2 | * | 3/2004 | Kim et al. | 349/38 |
| 6,794,228 B2 | * | 9/2004 | Kim | 438/149 |
| 6,859,254 B2 | * | 2/2005 | Kim et al. | 349/190 |
| 6,862,050 B2 | * | 3/2005 | Rho et al. | 349/44 |
| 6,862,052 B2 | * | 3/2005 | Kim | 349/54 |
| 6,914,641 B2 | * | 7/2005 | Choo et al. | 349/38 |

OTHER PUBLICATIONS

Je-Hsiung Lan et al., 'Planarization technology Of a Si:H TFTs for Am-LCDs', Jul. 1988, SPIE vol. 3421, SPIE conference On Display Techologies II , Taipei Taiwan, pp. 170-182. (already mailed Sep. 1, 05 see EDAN).*

(Continued)

*Primary Examiner*—Long Pham
*Assistant Examiner*—Shrinivas Rao
(74) *Attorney, Agent, or Firm*—Morgan, Lewis & Bockius LLP

(57) ABSTRACT

A method of fabricating a liquid crystal display device is disclosed in the present invention. The method includes forming a thin film transistor in a pixel region and a pad on an edge region of a first substrate, depositing an organic passivation layer over the first substrate, and removing the organic passivation layer in the edge region using a diffraction mask to expose a portion of the pad, wherein the diffraction mask has a slit portion including a plurality of slits having different widths.

17 Claims, 8 Drawing Sheets

OTHER PUBLICATIONS

Phillip E. Garrou et al., 'Stress-Buffer and Passivation Processes for SI and GaAs IC's and Passive Components Using Photosensitive BCB: Process Technology and Reliability Data' IEEE Transactions on AdvancedPackaging, vol. 22 No. 3 Aug. 1999, pages already mailed Sep. 1, 2005—see EDAN).*

M.J. Radler et al., "A2.4 : Cyclotene Advanced Electronics resins for High-Aperture AMLCD Applications ", 1996, SID 96 Applications Digest pp. 33-36, already mailed Sep. 1, 2005—see EDAN.*

* cited by examiner

METHOD OF FABRICATING LIQUID CRYSTAL DISPLAY DEVICE

This application claims the benefit of the Korean Patent Application No. P2002-087480 filed on Dec. 30, 2002, which is hereby incorporated by reference.

BACKGROUND OF THE INVENTION

1. Field of the Invention

The present invention relates to a liquid crystal display device, and more particularly, to a method of fabricating a liquid crystal display device. Although the present invention is suitable for a wide scope of applications, it is particularly suitable for removing a hangover of an organic insulating layer around an edge portion of a pad by using a diffraction mask.

2. Discussion of the Related Art

A liquid crystal display device as a transmissive flat display device is widely applied to various electronic equipments, such as mobile phones, personal digital assistants (PDA's), and notebook computers. Recently, the LCD has been in the spotlight due to its advantages, such as light weight, slim shape, and high definition reproducibility. Furthermore, according to the increase in demand for a digital TV, a high definition TV, and a panel type TV, researches on a wide screen LCD have been actively proceeded.

Generally, an LCD is divided into several types according to the method of driving liquid crystal molecules. Recently, a thin film transistor-liquid crystal display (TFT-LCD) having a rapid response speed and less residual image is mainly used.

FIG. 1 is a plane view illustrating a structure of a TFT liquid crystal display device. As shown in FIG. 1, the TFT liquid crystal display device 1 includes a first substrate 3, a second substrate 5, and a liquid crystal layer 17 formed therebetween. On the first substrate 3, a plurality of gate lines 11 and data lines 13 defining a plurality of pixels are arranged in horizontal and vertical directions, each gate line 11 and each data line 13 is electrically connected to a driving device (not shown) through pads 12 and 14 formed in a non-display region of the first substrate 3. In addition, a TFT 15 is formed in each pixel. According to a scan signal applied through the gate line 11, the TFT 15 is switched, and an image signal inputted through the data line 13 is applied to the liquid crystal layer 17.

A sealing region having a sealant coated thereon is formed at the edge portion of the first and second substrates 3 and 5 in order to attach the first and second substrates 3 and 5 to each other. Herein, as shown in FIG. 1, a black matrix as a light shielding member is formed in the sealing region in order to prevent the light from transmitting the sealing region. The black matrix 9 is formed on the upper substrate 5, and only the sealing region is shown in FIG. 1. However, the black matrix 9 is formed between each pixel or on the TFT region and prevents the light transmittance as the non-display region of the liquid crystal display device.

In FIG. 1, the reference numeral 20 is a liquid crystal injection hole 20 for injecting liquid crystal after attaching the first and second substrates 3 and 5. After injecting the liquid crystal through the liquid crystal injection hole 20, it is encapsulated by an encapsulation material 22. Because the encapsulation material 22 is generally made of photo-sensitive materials, after filling the encapsulation material 22 in the liquid crystal injection hole 20, light, such as ultraviolet rays, is irradiated in order to harden the encapsulated material.

FIGS. 2A to 2G illustrate the method of fabricating a liquid crystal display device in accordance with the related art. Herein, the liquid crystal display device uses a passivation layer made of an organic material in order to protect the TFT. The liquid crystal display device is divided into a pixel region and an edge region for simplicity.

First, as shown in FIG. 2A, a metal such as Al or Al alloy or Cu is deposited on the first substrate 3, which is formed of a transparent material, such as glass, by an evaporating method or sputtering method. Etching is then performed with an etchant. A gate electrode 41 including a single layer or a plurality of layers is formed on the pixel region, a gate pad 12 is formed on the edge region, and a gate insulating layer 32 is deposited thereon. Also, a semiconductor material, such as amorphous silicon (a-Si), is deposited by a chemical vapor deposition (CVD) method, and etching is then performed. Accordingly, a semiconductor layer 42 is formed on the pixel region. A metal, such as Cr, Mo, Al, Al alloy or Cu, is deposited by the evaporating or sputtering method, and etching is then performed with an etchant. Thus, a source electrode 43 and a drain electrode 44 made of one or more layers are formed. Herein, as shown in FIG. 2A, a data line 105 is formed on a gate insulating layer 122, at the same time as the forming of the source electrode 16 and the drain electrode 117

Thereafter, a passivation layer 34 is formed by depositing an organic material, such as benzo cyclo butene (BCB) or photo-acryl, on the entire first substrate 3.

And, as shown in FIG. 2B, a photoresist layer 51 is formed by depositing a photoresist on the passivation layer 34, a diffraction mask 55 is arranged thereon, and light such as ultraviolet rays is irradiated. The diffraction mask 55 can transmit and shield the light. The intensity of the transmitted light may be adjusted by using a slit type diffraction mask having slits at set intervals. Accordingly, when the light is irradiated on the photoresist layer 51 by using the diffraction mask 55 and a developer is applied, as shown in FIG. 2C, the upper portion of the drain electrode 44 and the photoresist on the upper portion of the gate pad 12 are removed, and a part of the photoresist on the side portion of the gate pad 12 is removed. (A sealant is printed on the portion in order to attach the liquid crystal panel. Hereinafter, it is referred to as a sealing region.)

Afterwards, by etching the passivation layer 34 with the photoresist layer 51 remaining thereon, as shown in FIG. 2D, the upper portion of the drain electrode 44 in the pixel region and the passivation layer 34 on the upper portion of the gate pad 12 in the edge region are removed, and contact holes 36 and 37 are respectively formed at the upper portion of the drain electrode 44 in the pixel region and the upper portion of the gate pad 12 in the edge region.

And, after exposing the passivation layer 34 in the sealing region, by further developing the photoresist layer 51 on the passivation layer 34, the passivation layer 34 is etched, and accordingly a hole 38 is formed on the passivation layer 34 in the sealing region, as shown in FIG. 2E. Afterwards, by depositing a transparent electrode, such as indium tin oxide (ITO) or indium zinc oxide (IZO), on the passivation layer 34 in the pixel region and the edge region, a pixel electrode 47 contacting the drain electrode 44 through the contact hole 36 is formed at the pixel region, and a metal layer 48 is formed on the gate pad 12 in the edge region.

In the meantime, as shown in FIG. 2G, a black matrix 52 and a color filter layer 54 as formed on the second substrate 5 formed of a transparent material such as glass. A sealant 62 is printed onto the sealing region, and the first and second substrates 3 and 5 are attached by a pressure difference.

Herein, because the sealant 62 has a poor adhesion characteristic with an organic material, the sealant 62 is contacted with the gate insulating layer 32 through the hole 38 formed at the sealing region, and accordingly the first and second substrates 3 and 5 are attached to each other.

As described above, in the related art method of fabricating the liquid crystal display device, the fabrication process is simplified by forming the contact hole on the gate pad 12 in the edge region or forming the hole 38 for the sealant adhesion.

However, in the use of the diffraction mask, problems that occur will be described as follows.

FIG. 3 is a plane view illustrating the edge region of the liquid crystal panel according to the related art. The diffraction mask 55 is arranged in order to expose the gate pad 12. As described in FIG. 3, the light is irradiated on the pad (namely, a photoresist formed on the pad) through a slit portion, at which a plurality of slits having the same width are formed, of the diffraction mask 55 arranged in the edge region.

FIGS. 4A and 4B are cross-sectional views illustrating the process for exposing the pad in the edge region by using the organic insulating layer according to the related art. First, as shown in FIG. 4A, by irradiating light through the diffraction mask 55 and applying the developer on the photoresist layer 51 formed on the upper portion of the organic insulating layer 34, the photoresist layer 51 is developed. And, as shown in FIG. 4B, by etching the passivation layer 34 formed of the organic material and etching the gate insulating layer 32 on the gate pad 12, the gate pad 12 is exposed to the outside, and the metal layer 48 made of ITO or IZO is formed on the gate pad 12.

In the meantime, the gate insulating layer 32 formed of an organic material has a height difference by the thickness of the gate pad 12. And, the uniform thickness of the passivation layer 34 is removed by etching along the entire substrate 3. More specifically, because the passivation layer 34 on the gate pad 12 and the passivation layer 12 between the gate pads 12 are uniformly removed, as shown in FIG. 4B, the passivation layer 34 as the organic material remains on the gate insulating layer 32 between the gate pads 12. When the metal layer 48 such as ITO or IZO is formed, the metal layer 48 is formed on the organic passivation layer 34. However, because interfacial characteristics between the metal layer 48 and the organic material are poor, the metal layer 48 is separated from the organic passivation layer 32 in forming of the metal layer 48, and accordingly deficiency occurs in the liquid crystal display device.

SUMMARY OF THE INVENTION

Accordingly, the present invention is directed to a method of fabricating a liquid crystal display device that substantially obviates one or more of problems due to limitations and disadvantages of the related art.

Another object of the present invention is to provide a method of fabricating a liquid crystal display device capable of simplifying the fabrication process by exposing a pad by removing an organic passivation layer on the edge region of a liquid crystal panel.

Another object of the present invention is to provide a method of fabricating a liquid crystal display device capable of preventing a hangover of an organic passivation layer between pads in removing the organic passivation layer by differentiating the widths of slits formed at a slit portion of a diffraction mask or differentiating shapes of slits.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming a thin film transistor in a pixel region and a pad on an edge region of a first substrate, depositing an organic passivation layer over the first substrate, and removing an organic passivation layer in the edge region using a diffraction mask to expose a portion of the pad, wherein the diffraction mask has a slit portion including a plurality of slits having different widths.

Herein, organic passivation layer is formed of one of benzo cyclo butene (BCB) and photo-acryl. And, the step of removing the organic passivation layer includes depositing a photoresist layer on the organic passivation layer in the edge region, placing the diffraction mask having first and second light transmission regions over the photoresist layer for a light exposure, so that the first light transmission region transmits an amount of light greater than the second light transmission region, developing the photoresist layer completely remove the photoresist layer of the second light transmission region and to remain the photoresist layer of the first light transmission region, etching the organic passivation layer to remove a portion of the organic passivation layer of the second light transmission region, removing the photoresist layer, and etching the organic passivation layer to remove a remaining organic passivation layer. Herein, the diffraction mask of the second transmission region has a slit width greater than that of the first light transmission region. On the other hand, the diffraction mask of the second light transmission region has a plurality of slits.

In another aspect of the present invention, a method of fabricating a liquid crystal display device includes forming a thin film transistor in a pixel region and a pad on an edge region of a first substrate, depositing an organic passivation layer over the first substrate, depositing a photoresist layer on the organic passivation layer in the edge region, placing the diffraction mask having first and second transmission regions over the photoresist layer for a light exposure, so that the first light transmission region transmits an amount of light greater than the second light transmission region, developing the photoresist layer to completely remove the photoresist layer of the second light transmission region and to remain the photoresist layer of the first light transmission region, etching the organic passivation layer to remove a part of the organic passivation layer of the second light transmission region, removing the photoresist layer, and etching the organic passivation layer to remove a remaining organic passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

In a liquid crystal display device using an inorganic material as a passivation layer, because a pixel electrode is formed on the inorganic passivation layer, it is required to maintain a gap between a gate line (for applying a scan signal from the outside to a gate electrode) and a pixel electrode or between a data line (for applying an image signal from the outside to a source/drain electrode) and the pixel electrode. If the gate line or the data line overlaps a part of the pixel electrode having the passivation layer therebetween, a parasitic capacitance occurs, and accordingly vertical crosstalk occurs. The crosstalk causes a flicker phenomenon, and it is a major cause for reducing a picture quality of the liquid crystal display device.

On the other hand, in a liquid crystal display device using a passivation layer formed of an organic material, because an organic material having a low dielectric constant is deposited as a passivation layer, if the gate line or the data line overlaps the pixel electrode, the parasitic capacitance does not occur. More specifically, in the liquid crystal display device having the organic passivation layer, the pixel electrode can overlap the gate line or the data line. Accordingly, a liquid crystal display device having a high aperture ratio compared to a liquid crystal display device having an inorganic passivation layer can be fabricated. In addition, in the liquid crystal display device having the organic passivation layer, a layer having a flat surface can be formed due to the characteristics of an organic material.

In the present invention, in the liquid crystal display device having the organic passivation layer, a hangover of the organic passivation layer can be prevented from occurring at the edge region of the liquid crystal panel. Particularly, the remainings of an organic passivation layer without any additional process can be prevented. In the present invention, an etching thickness of the passivation layer in the edge region can be adjusted by varying a width and a shape of slits of the slit portion of a diffraction mask used for etching a passivation layer at the edge region. As a result, the organic material can be completely removed.

Hereinafter, a method of fabricating a liquid crystal display device in accordance with the present invention will be described with reference to the accompanying drawings. Only an edge region will be described, and other descriptions will be omitted for simplicity.

Figure 1:
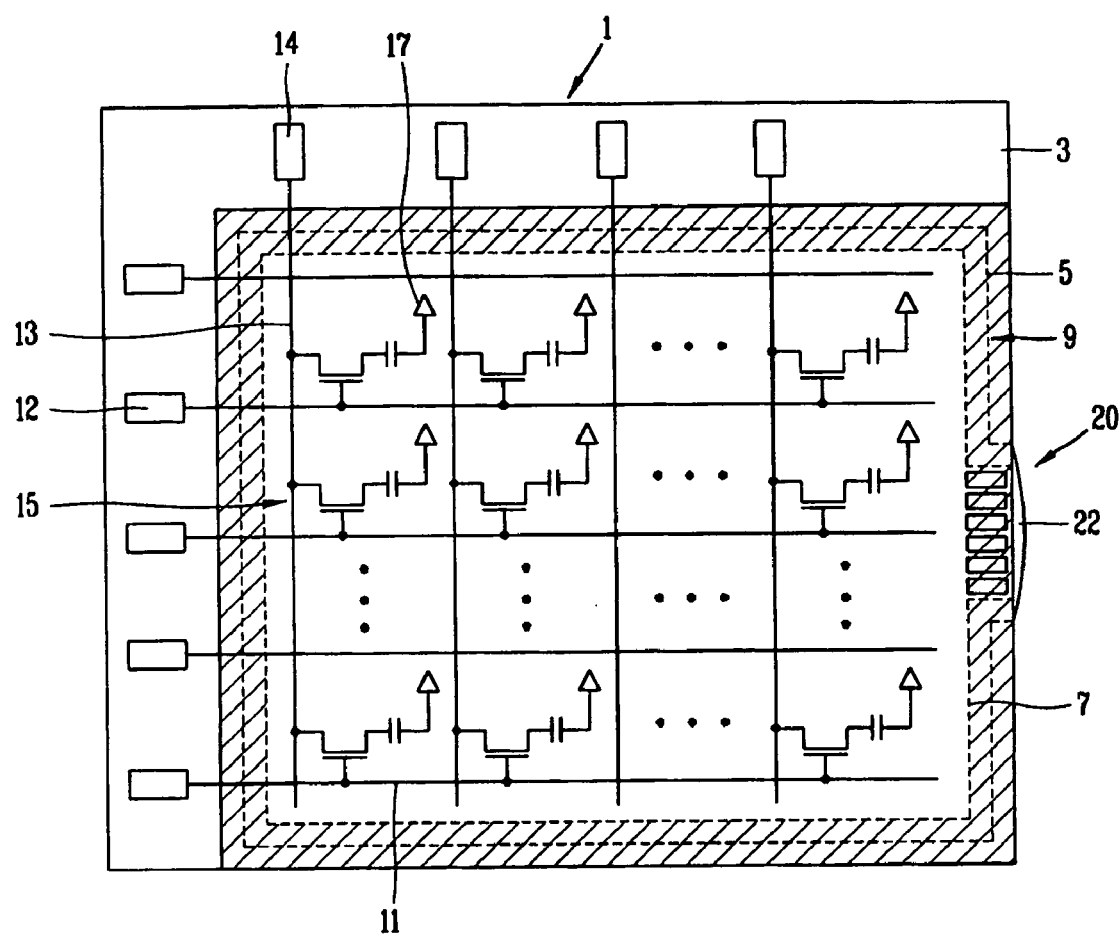
FIG. 1 is a schematic plane view illustrating a liquid crystal display device in accordance with the related art.
Figure 2A:
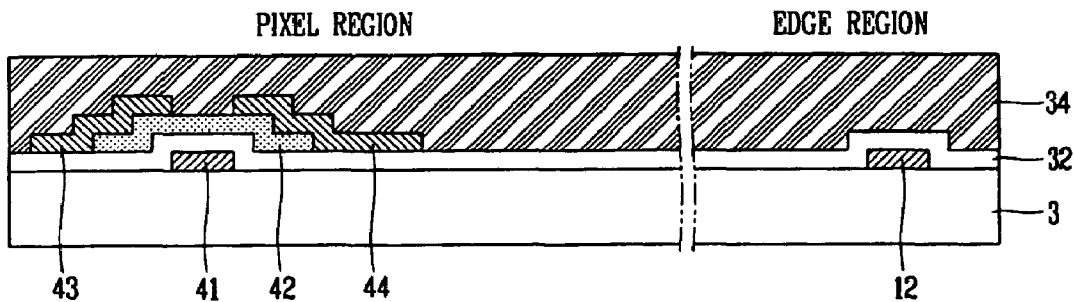
FIGS. 2A to 2G are cross-sectional views illustrating the process for fabricating a liquid crystal display device in accordance with the related art.
Figure 2B:
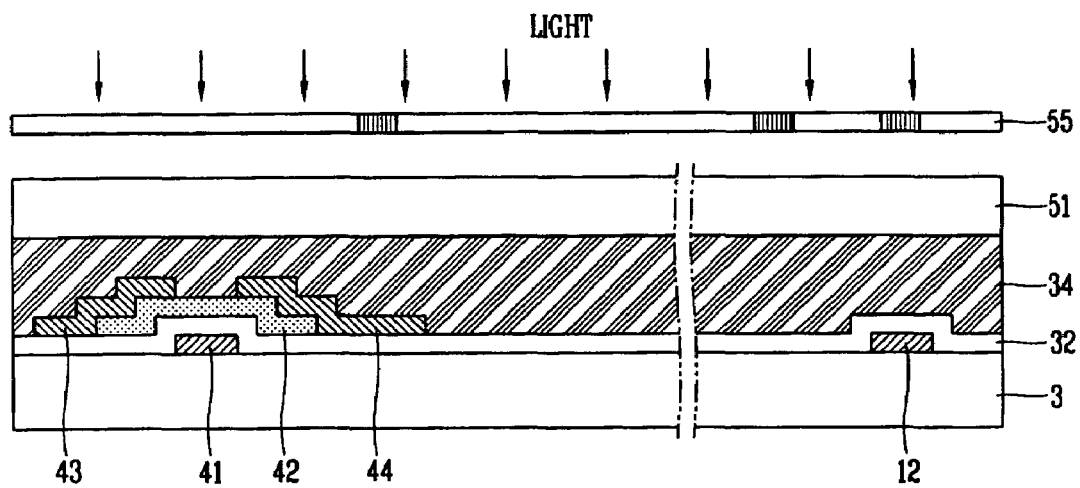
Figure 2C:
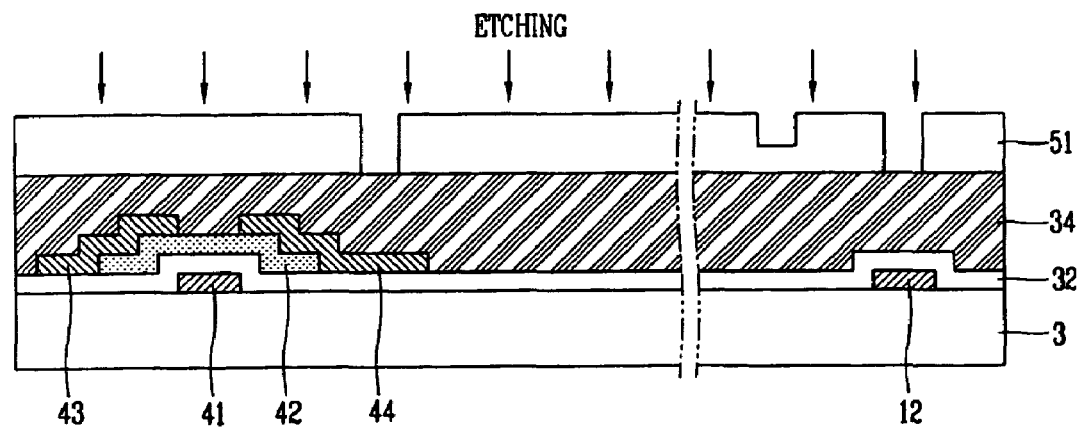
Figure 2D:
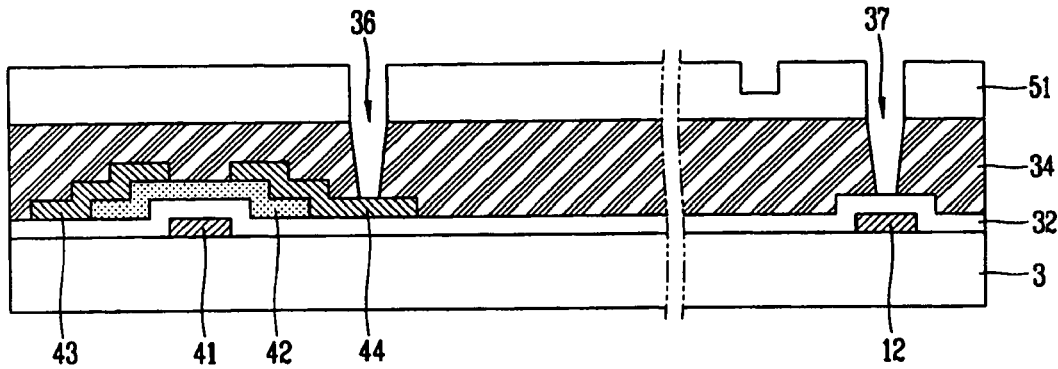
Figure 2E:
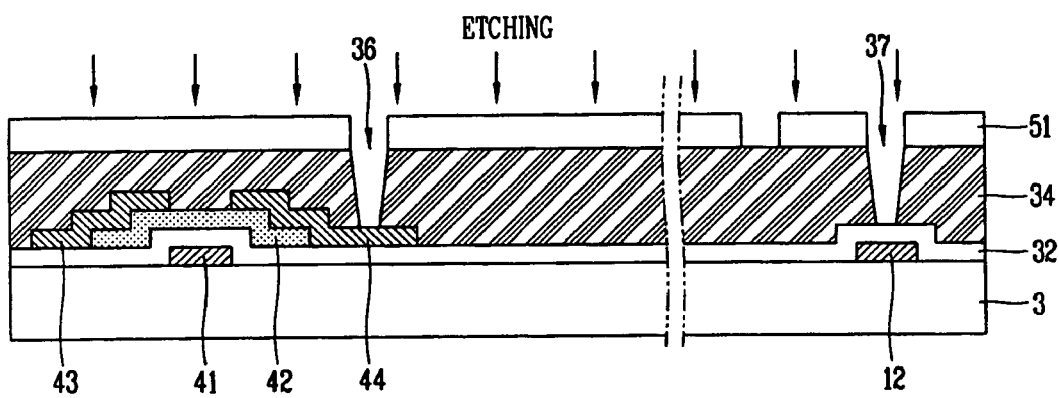
Figure 2F:
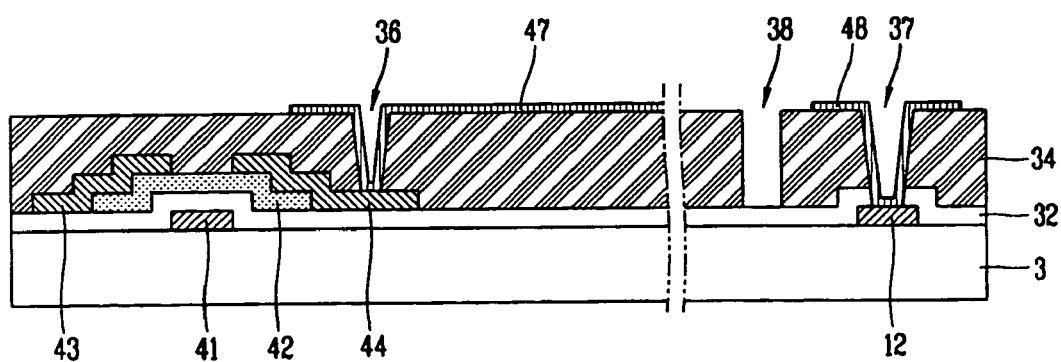
Figure 2G:
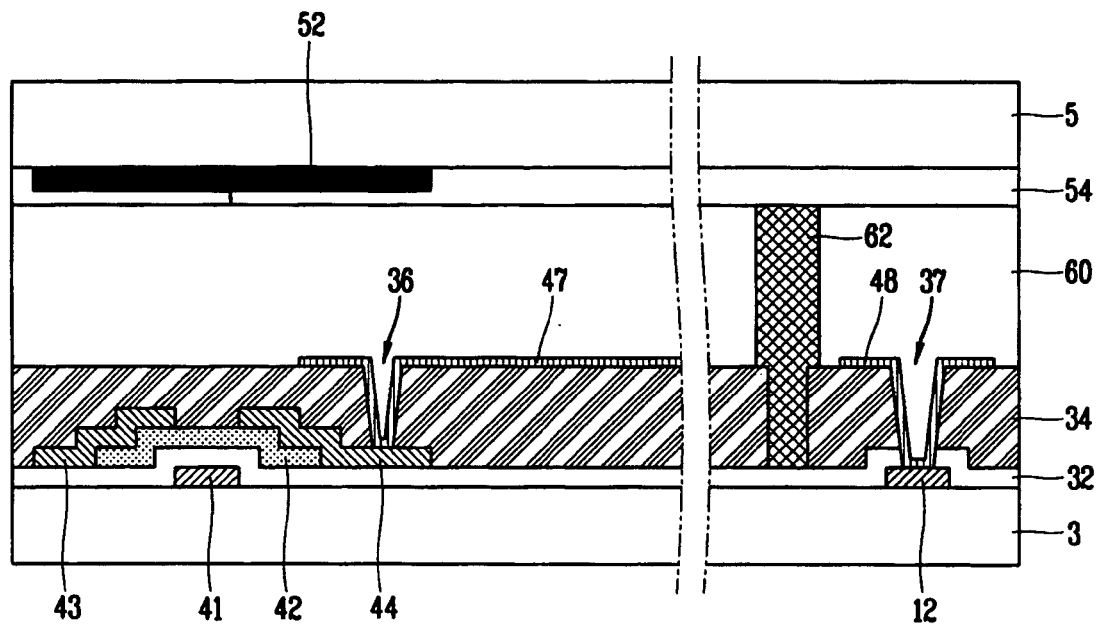
Figure 3:
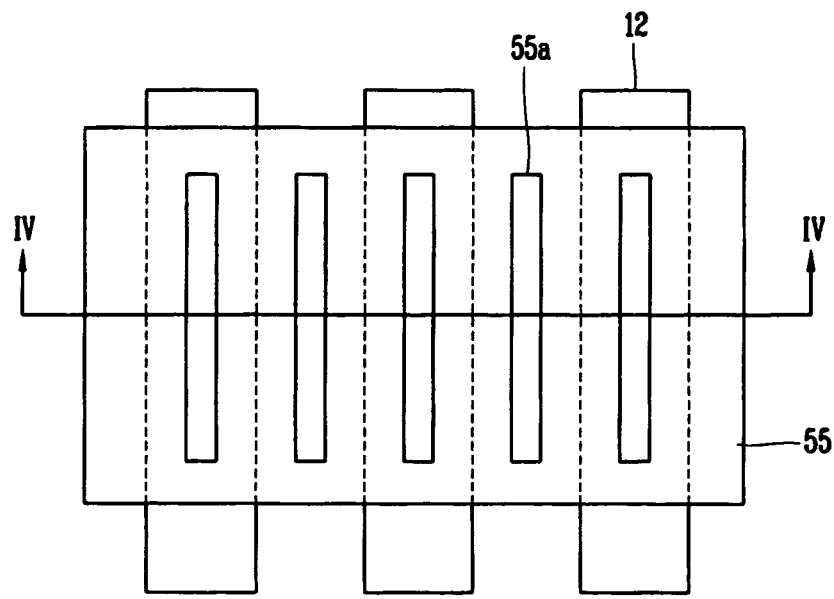
FIG. 3 illustrates a diffraction mask arranged in a pad region of a liquid crystal panel in accordance with the related art.
Figure 4A:
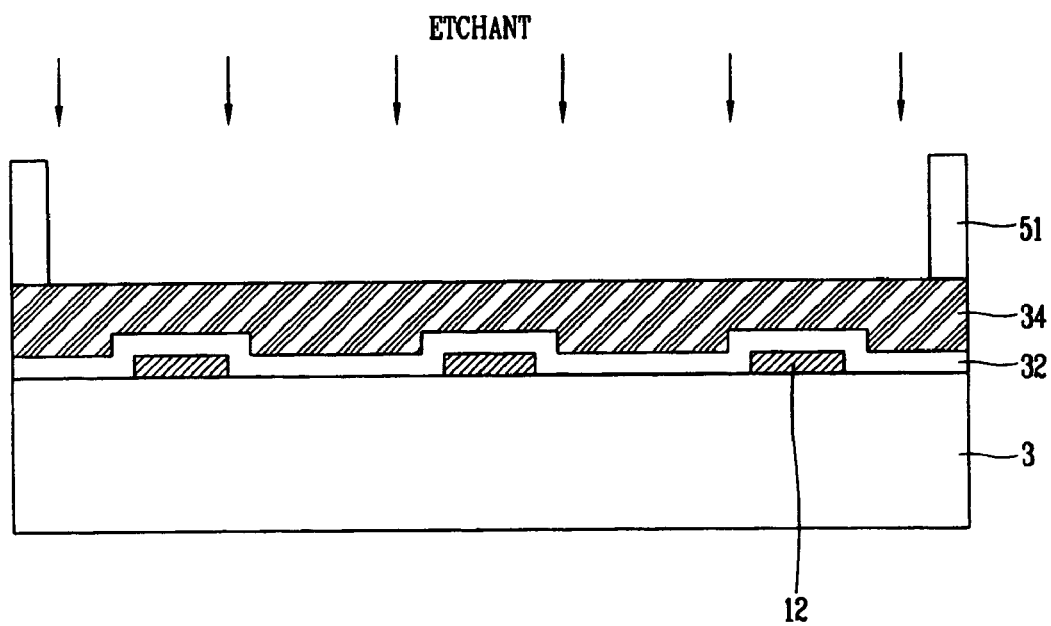
FIGS. 4A and 4B illustrate exposing a pad in a pad region by using the diffraction mask of FIG. 3 in accordance with the related art.
Figure 4B:
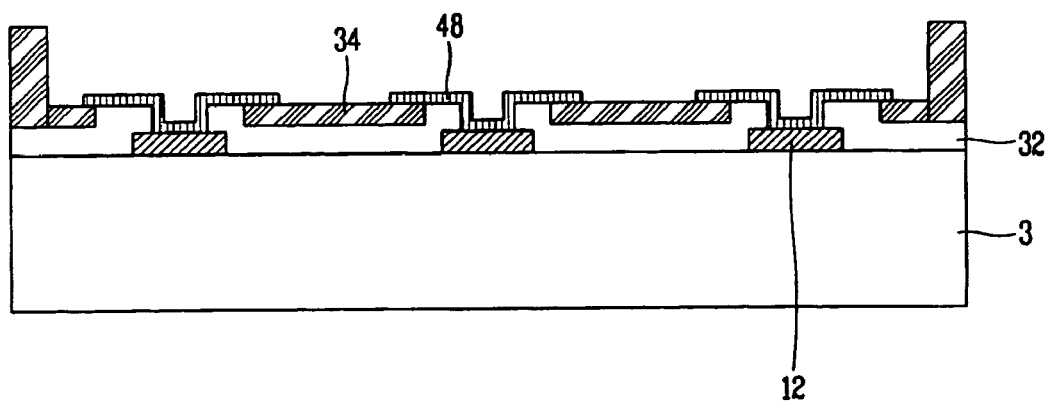
Figure 5:
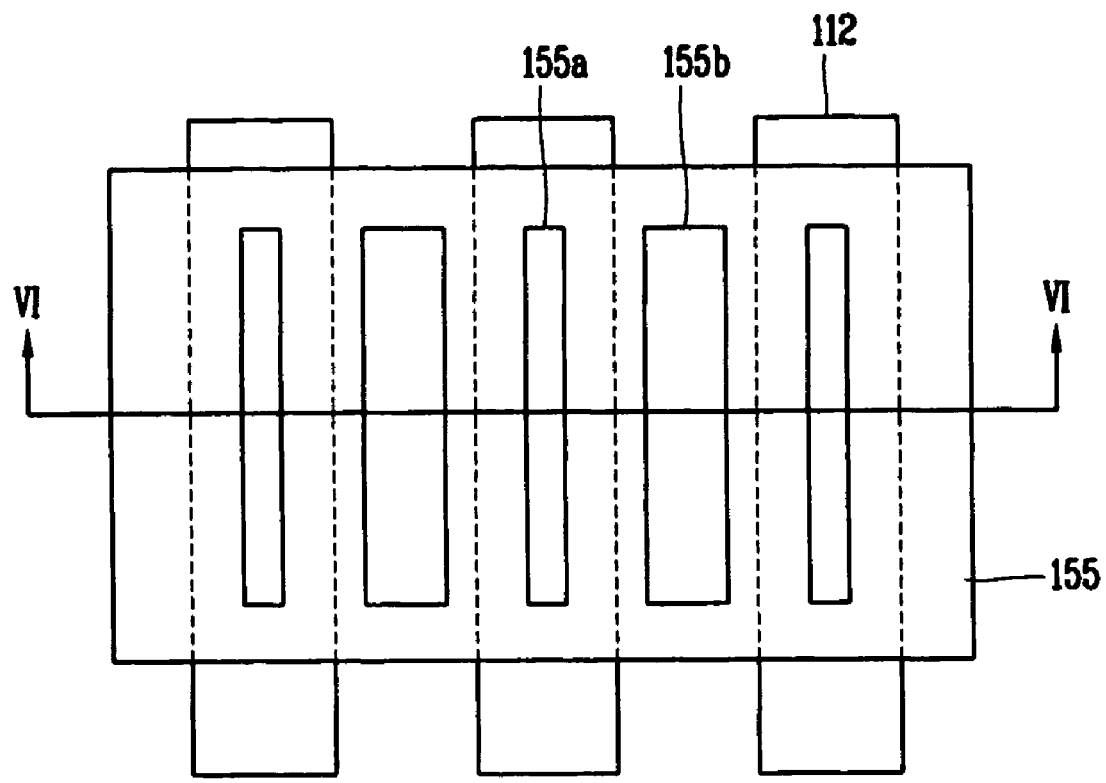
FIG. 5 illustrates shows a diffraction mask arranged in a pad region of a liquid crystal panel in accordance with the present invention.

FIG. 5 is a plane view illustrating a gate pad formed at the edge region of the liquid crystal panel. It shows a diffraction mask 155 arranged in order to remove a passivation layer formed on the pad 112.

As shown in FIG. 5, a slit portion of the diffraction mask 155 for transmitting (or diffracting) an amount of light is arranged above a plurality of pads 112. Herein, slits formed at the slit portion have widths different from each other. More specifically, a slit 155b placed between the pads 112 has a width greater than that of a slit 155a placed above the pad 112. A gate insulating layer deposited on the pad 112 has a thickness difference due to the thickness of the pad 112. In addition, an organic passivation layer formed on the gate insulating layer has thickness difference, the organic passivation layer on the pad 112 has a thickness less than that of an organic passivation layer between the pads 112. In eliminating the organic passivation layer in the pad region, the organic passivation layer between the pads 112 is further removed. As described above, because the amount of the organic passivation layer removed in the pad region is different, a width of the slit 155 is formed differently.

Figure 6A:
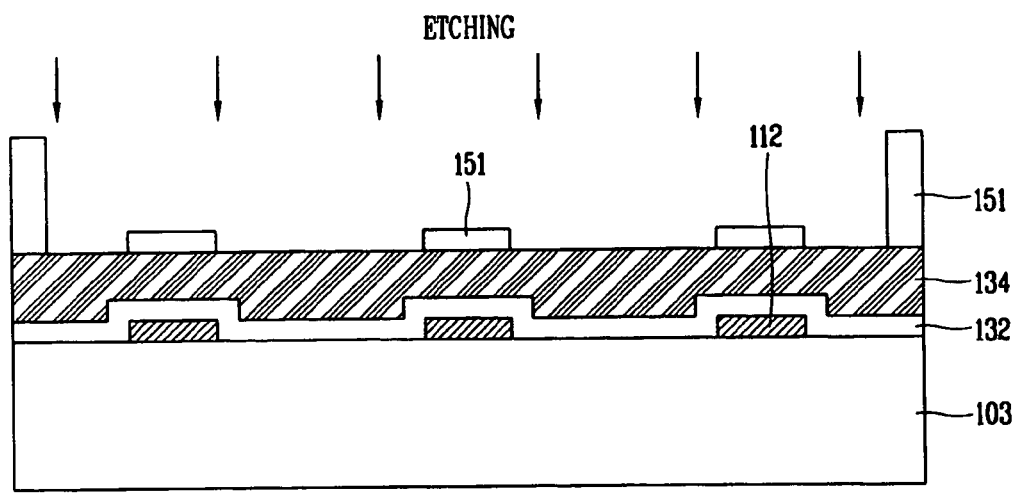
FIGS. 6A to 6C are cross-sectional views illustrating the process for exposing a pad in a pad region by using the diffraction mask of FIG. 5 in accordance with the present invention.
Figure 6B:
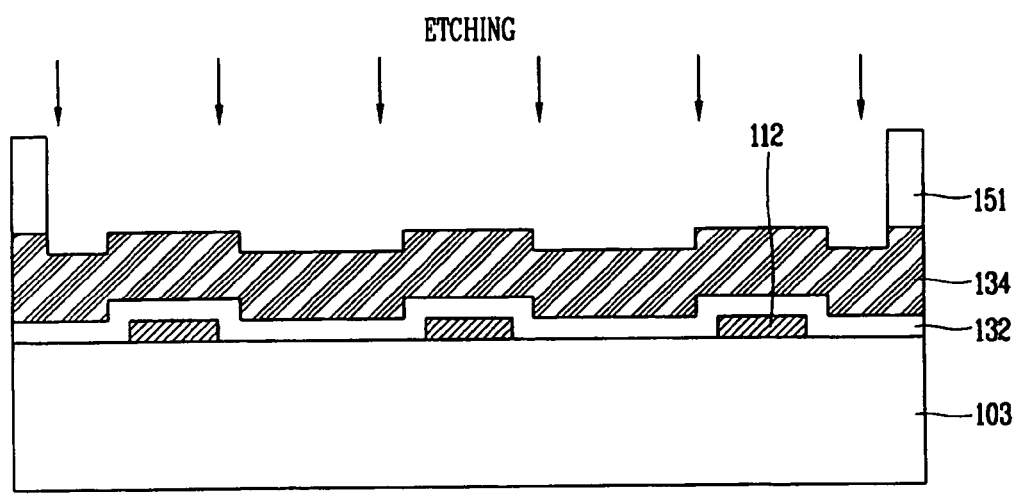
Figure 6C:
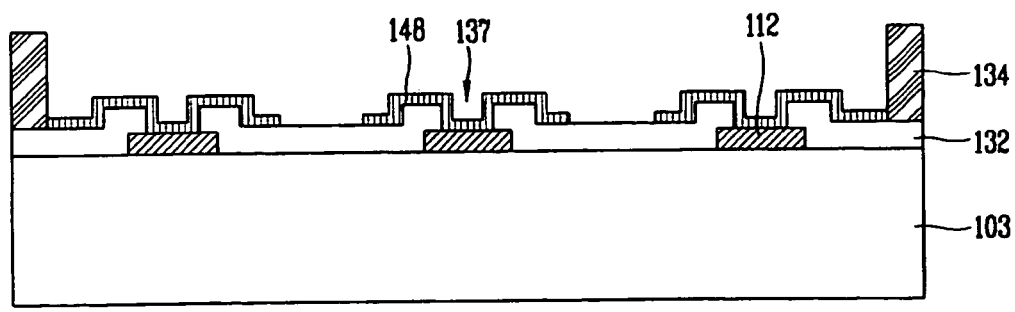

FIGS. 6A to 6C are cross-sectional views illustrating the process for exposing a pad in the pad region by using the diffraction mask.

As shown in FIG. 6A, by the diffraction mask 155 including the slit portion having the slits having different widths, a photoresist layer 151 deposited on the organic passivation layer 134 is developed, an amount of light irradiated on the photoresist layer 151 is different by the slits having different widths, a photoresist layer 151 between the pads 112 is completely removed. However, the photoresist layer 151 on the pads 112 remains.

Accordingly, in such a state, when the organic passivation layer 134 is etched, as shown in FIG. 6B, the organic passivation layer 134 on the pad 112 on which the photoresist layer 151 cannot be removed, and only the organic passivation layer 134 between the pads 112 is etched. Generally, the organic passivation layer 134 is etched by a dry etching method using an etching gas. Herein, as shown in FIG. 6B, only a part of the etching is performed. Thus, only a part of the organic passivation layer 134 is removed. Thereafter, the remaining photoresist layer 151 is removed by performing an ashing process, the organic passivation layer 134 is etched again, as shown in FIG. 6C, the organic passivation layer in the pad region is removed completely. More specifically, because the etching thickness of the organic passivation layer 134 on the pad 112 is different from that between the pads 112, the organic passivation layer in the pad region is removed completely.

And, by removing the gate insulating layer 132 on the pad 112, a hole 137 for exposing the pad 112 to the outside is formed. An ITO or IZO layer is deposited and etched, so that a metal layer 148 is formed on the pad 112.

As described above, in the method of fabricating the liquid crystal display device in accordance with the present invention, when etching the organic passivation layer in the pad region at the edge region of the liquid crystal panel by using the diffraction mask, the organic passivation layer on the gate insulating layer can be removed completely by forming different widths of slits of the diffraction mask. More specifically, by forming different widths of slits, the amount of light irradiated on the organic passivation layer can be adjusted through the diffraction mask.

In the meantime, the amount of light irradiated on the photoresist layer varies with the intensity of light diffracted by the diffraction mask. Accordingly, the amount of light irradiated on the photoresist layer is not determined only by a slit width of the diffraction mask.

Figure 7:
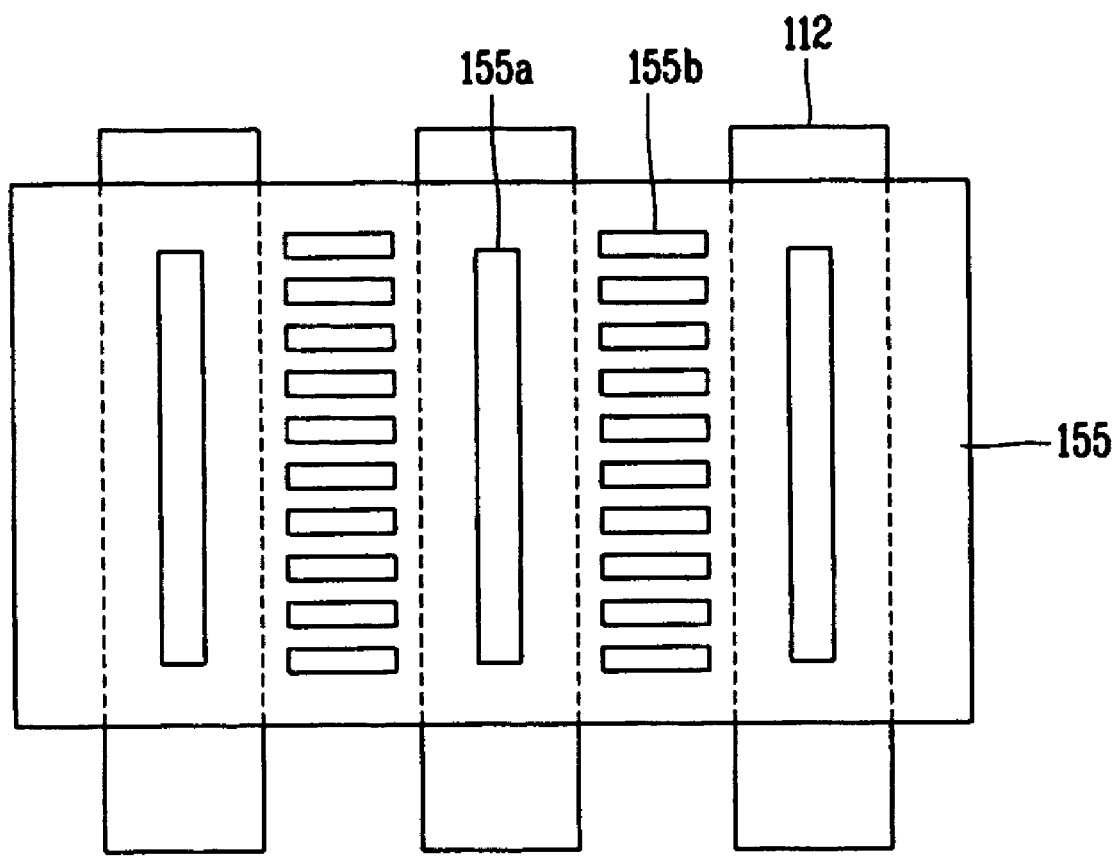
FIG. 7 illustrates a diffraction mask having a different shape arranged in a pad region of a liquid crystal panel in accordance with the present invention.

FIG. 7 shows a diffraction mask with slits having shapes different from those of the diffraction mask in FIG. 5. As shown in FIG. 7, the slit is formed on the pad 112 in the length direction of the pad 112, so as to have a desirable width. On the other hand, a plurality of slits having a desirable size are formed between the pads 112. Herein, because the total size of the slits formed between the pads 112 is greater than the size of the slit formed on the pad 112, more light can be transmitted. Thus, in etching of the organic passivation layer, a hangover of the organic passivation layer does not remain.

As described above, in the method of fabricating the liquid crystal display device in accordance with the present invention, when exposing the pad, a hangover of the organic passivation layer can be prevented by completely eliminating the organic passivation layer in the pad region at the edge region of the liquid crystal panel by adjusting the amount of light transmitting the slit portion. Accordingly, when forming the metal layer such as ITO on the exposed pad region, since the metal layer does not contact an organic material, a separation of the metal layer can be prevented. In addition, in a probe test, the combination of a probe by the organic material can also be prevented.

It will be apparent to those skilled in the art that various modifications and variations can be made in the method of fabricating the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:
   forming a thin film transistor in a pixel region and a pad on an edge region of a first substrate;
   depositing an organic passivation layer over the first substrate; and
   removing the organic passivation layer in the edge region using a diffraction mask to expose a portion of the pad, wherein the diffraction mask has a slit portion including a plurality of slits having different widths.

2. The method of claim 1, wherein the organic passivation layer is formed of one of benzo cyclo butene (BCB) and photo-acryl.

3. The method of claim 1, wherein the removing the organic passivation comprises,
   depositing a photoresist layer on the organic passivation layer in the edge region;
   placing the diffraction mask having first and second light transmission regions over the photoresist layer for a light exposure, so that the first light transmission region transmits an amount of light greater than the second light transmission region;
   developing the photoresist layer to completely remove the photoresist layer corresponding to the second light transmission region and to retain the photoresist layer corresponding to the first light transmission region;
   etching the organic passivation layer to remove a part of the organic passivation layer corresponding to the second light transmission region;
   removing the retained photoresist layer corresponding to the first light transmission region; and
   etching the organic passivation layer to remove the organic passivation layer in the first and second light transmission regions.

4. The method of claim 3, wherein the diffraction mask of the second transmission region has a slit width greater than that of the first transmission region.

5. The method of claim 3, wherein the diffraction mask of the second light transmission region has a plurality of slits.

6. The method of claim 1, wherein the forming a thin film transistor comprises,
   forming a gate electrode on the first substrate;
   depositing a gate insulating layer over the first substrate;
   forming a semiconductor layer on the gate insulating layer; and
   forming a source electrode and a drain electrode on the semiconductor layer.

7. The method of claim 1, further comprising forming a metal layer on the exposed portion of the pad.

8. The method of claim 7, wherein the metal layer is formed of one of indium tin oxide (ITO) and indium zinc oxide (IZO).

9. The method of claim 1, further comprising:
   forming a black matrix and a color filter layer on a second substrate;
   forming a sealant on the edge region of the first substrate and attaching the first and second substrates to each other; and
   forming a liquid crystal layer between the first and second substrates.

10. A method of fabricating a liquid crystal display device, comprising:
    forming a thin film transistor in a pixel region and a pad on an edge region of a first substrate;
    depositing an organic passivation layer over the first substrate;
    depositing a photoresist layer on the organic passivation layer in the edge region;
    placing the diffraction mask having first and second light transmission regions over the photoresist layer for a light exposure, so that the first light transmission region transmits an amount of light greater than the second light transmission region;
    developing the photoresist layer to completely remove the photoresist layer of the second light transmission region and to remain the photoresist layer of the first light transmission region;
    etching the organic passivation layer to remove a part of the organic passivation layer of the second light transmission region;
    removing the photoresist layer; and
    etching the organic passivation layer to remove a remaining organic passivation layer.

11. The method of claim 10, wherein the organic passivation layer is formed of one of benzo cyclo butene (BCB) and photo-acryl.

12. The method of claim 10, wherein the diffraction mask of the second transmission region has a slit width greater than that of the first transmission region.

13. The method of claim 10, wherein the diffraction mask of the second light transmission region has a plurality of slits.

14. The method of claim 10, wherein the forming a thin film transistor comprises,
   forming a gate electrode on the first substrate;
   depositing a gate insulating layer over the first substrate;
   forming a semiconductor layer on the gate insulating layer; and
   forming a source electrode and a drain electrode on the semiconductor layer.

15. The method of claim 10, further comprising forming a metal layer on the exposed portion of the pad.

16. The method of claim 15, wherein the metal layer is formed of one of indium tin oxide (ITO) and indium zinc oxide (IZO).

17. The method of claim 10, further comprising:
   forming a black matrix and a color filter layer on a second substrate;
   forming a sealant on the edge region of the first substrate and attaching the first and second substrates to each other; and
   forming a liquid crystal layer between the first and second substrates.

* * * * *